(12) United States Patent
Cristinacce et al.

(10) Patent No.: US 8,594,430 B2
(45) Date of Patent: Nov. 26, 2013

(54) METHOD OF LOCATING FEATURES OF AN OBJECT

(75) Inventors: David Cristinacce, Manchester (GB); Timothy Francis Cootes, Stockport (GB)

(73) Assignees: The University of Manchester, Manchester (GB); Toyota Motor Europe, Brussels (BE)

( * ) Notice: Subject to any disclaimer, the term of this patent is extended or adjusted under 35 U.S.C. 154(b) by 1210 days.

(21) Appl. No.: 12/296,283

(22) PCT Filed: Apr. 5, 2007

(86) PCT No.: PCT/GB2007/001262
§ 371 (c)(1),
(2), (4) Date: Oct. 6, 2008

(87) PCT Pub. No.: WO2007/116208
PCT Pub. Date: Oct. 18, 2007

(65) Prior Publication Data
US 2009/0116749 A1 May 7, 2009

(30) Foreign Application Priority Data
Apr. 8, 2006 (GB) .................................. 0607143.5

(51) Int. Cl.
*G06K 9/00* (2006.01)
*G06K 9/62* (2006.01)

(52) U.S. Cl.
USPC .......................... 382/181; 382/118; 382/228

(58) Field of Classification Search
USPC ......... 382/181, 195, 209, 100, 103, 115, 118, 382/117, 151, 160, 155, 168, 190, 224, 225, 382/228, 276, 305, 291, 293
See application file for complete search history.

(56) References Cited

U.S. PATENT DOCUMENTS

| 6,072,893 A | 6/2000 | Luo et al. |
| 6,915,003 B2 | 7/2005 | Oosawa |

(Continued)

FOREIGN PATENT DOCUMENTS

| GB | 2360183 | * | 0/1899 |
| GB | 2360183 | | 9/2001 |

(Continued)

OTHER PUBLICATIONS

By Cristinacce D et al: "A Comparison of Shape Constrained Facial Feature Detectors", Proceedings of the International Conference on Automatic Face and Gesture Recognition, 2004, pp. 375-380, XP008059876.*

(Continued)

*Primary Examiner* — Sheela Chawan
(74) *Attorney, Agent, or Firm* — Patent Ingenuity, P.C.; Samuel K. Simpson

(57) ABSTRACT

A method of locating features of an object, of a class of objects, of a class of objects, within a target image. The method comprises initializing a set of feature points within the target image, each feature point corresponding to a predetermined feature for objects of the class of objects; deriving a set of template detectors, from the set of feature points, using a statistical model of the class of objects, each template detector comprising an area of image located about the location of a feature point for an object of the class of objects; comparing the set of template detectors with the target image; and updating the set of feature points within the target image in response to the result of the comparison.

23 Claims, 12 Drawing Sheets

(56) References Cited

U.S. PATENT DOCUMENTS

| | | |
|---|---|---|
| 2003/0016853 A1 | 1/2003 | Oosawa |
| 2005/0036690 A1 | 2/2005 | Zhou et al. |

FOREIGN PATENT DOCUMENTS

| | | |
|---|---|---|
| JP | 9044676 | 2/1997 |
| JP | 9050528 | 2/1997 |
| JP | 9251534 A | 2/1997 |
| JP | 9051534 | 9/1997 |
| JP | 11306325 | 11/1999 |
| JP | 200232735 | 1/2002 |
| JP | 2005078445 | 8/2006 |
| WO | WO02103618 | 12/2002 |
| WO | WO2005052860 | 6/2005 |

OTHER PUBLICATIONS

International Search Report for PCT Application No. PCT/GB2007/001262 dated Aug. 1, 2007.

British Search Report for British Application No. GB0607143.5 dated Aug. 20, 3006.

Cristinacce, D. et al., "A Comparision of Shape Consrained Facial Feature Detectors," Proceedings of the International Conference on Automatic Face and Gesture Recognition, pp. 375-380, Section 3.2 "Feature point models", Section 4.3 "Comparision with AAM.", May 2004.

Epshtein, B., et al. "Identifying Semantically Equivalent Object Fragments," Computer Vision and Pattern Recognition, 2005, IEEE Computer Society on San Diego, CA, USA Jun. 20-26, 2005, Piscataway, NJ, USA IEEE, Jun. 20, 2005, pp. 2-9, Section 3 "Description of the algorithm", Section 4 "Experimental results.".

Chen, H., et al. Association for Computing Machinery "Example-Based Composite Sketching of Human Portraits," Proceedings NPAR 2004. 3rd. International Symposium on Non-Photorealistic Animation and Rendering. Annecy, France, Jun. 7-9, 2004, Symposium on Non-Photorealistic Animation and Rendering, New York, NY, ACM, US, Jun. 7, 2004, pp. 95-102, Section 3. "System framework", Section 4 "Composing a face", Section 5.3 "Fitting structural components.".

Li, Y., et al. "Constructing facial identity surfaces for recognition," International Journal of Computer Vision, vol. 53, No. 1, 2003, pp. 71-92, Jul. 2003.

Cristinacce, D. et al. "A Multi-Stage Approach to Facial Feature Detection," University of Manchester, 2004, Sep. 2004.

Cootes, T.F., et al. "Active Appearance Models," Proc. European Conference on Comptuer Vision 1998 *H. Burkhardt and B. Nermann Ed.s), vol. 2, pp. 484-498, Springer, 1998, Feb. 1998.

Cristinacce, D. et al. "Facial Feature Detection and Tracking with Automatic Template Selection," International Conference on Automatic Face and Gesture Recognition 2006, Southampton, UK, 2006, pp. 429-434, Nov. 21, 2006.

Cristinacce, D. et al. "Feature Detection and Tracking with Constrained Local Models," British Machine Vision Conference, Edinburgh, England, 2006, pp. 929-938, Aug. 4, 2006.

Dowson, N., et al. "Simultaneous Modelling and Tracking (SMAT) of Features Sets," IEEE Computer Society Conference on Computer Vision and Pattern Recognition 2005, Jun. 20, 2005, pp. 99-105, Jun. 2, 2005.

* cited by examiner

Mode 1

Mode 2

Mode 1

Mode 2

Mode 1

Mode 2

Sequence 1

Sequence 2

Sequence 3

Sequence 1

Sequence 2

Sequence 3

Sequence 1

Sequence 2

Sequence 3

METHOD OF LOCATING FEATURES OF AN OBJECT

This application claims the benefit, under 35 U.S.C. §365, of International Application PCT/GB2007/001262 which was filed on Apr. 5, 2007, published in accordance with PCT Article 21(2) on Oct. 18, 2007 in English, and claimed the benefit of British patent application no. 0607143.5 filed on Apr. 8, 2006.

BACKGROUND

1. Field

The present invention relates to a method of locating features of an object. In particular, but not exclusively, the present invention relates to a method of fitting a model (also referred to as an appearance model) of a class of objects to a target image containing an object within that class.

2. General Background

Statistical models of appearance are widely used in computer vision and have many applications, including interpreting medical images and interpreting images containing faces. For many applications it can be useful to locate object features. For instance, for applications involving images containing faces, it can be useful to locate facial features such as the corners of the eyes and the corners of the mouth.

Conventionally, a statistical model of a class of objects is built representing intensity (greyscale or colour) and/or shape variation across an image or part of an image containing an object of that class. In the case of a facial appearance model, images of faces are used to train the system and thereby generate a model, these images being known as training images. Variation for any given face will tend to include similar patterns, and the model represents these patterns. Once the model has been built, the model may be fitted to target images to identify the locations of features of objects of that class within the target image.

There are several known methods of generating statistical appearance models, and using the models to identify and/or recognise facial features or features of other types of objects in images. A first known model is the Active Shape Model (ASM) described in T. F. Cootes, A. Hill, C. J. Taylor, and J. Haslam: "The use of active shape models for locating structures in medical images", Image and Vision Computing, 12(6):276-285, July 1994, and in T. F. Cootes, C. J. Taylor, D. Cooper, and J. Graham: "Active shape models—their training and application", Computer Vision and Image Understanding, 61 (1):38-59, January 1995. Both descriptions of the ASM are herein incorporated by reference.

The basic idea used by the ASM is to establish, from a training set, a pattern of "legal" variation of shapes and spatial relationships of structures in a given class of images (the class of images may be, for, example face images or hand images). Statistical analysis is used to give an efficient parameterisation of the pattern of legal variation, providing a compact representation of shape. The statistical analysis also provides shape constraints, which are used to determine whether the shape of a structure in an analysed image is a plausible example of the object class of interest.

A second known model is the Active Appearance Model (AAM) described in T. F. Cootes, G. J. Edwards, and C. J. Taylor: "Active appearance models", In H. Burkhardt and B. Neumann, editors, $5^{th}$ European Conference in Computer Vision, volume 2, pages 484-498. Springer, Berlin, 1998. The AAM uses a combined statistical model of shape and texture. Both the ASM and the AAM were developed at the Victoria University of Manchester, United Kingdom. Both of these models are based upon the use of normalised intensity values. The ASM and the AAM are both generalisations of Eigen-face models. Eigen-face models are based upon the use of intensity values.

SUMMARY

According to a first aspect of the present invention there is provided a method of locating features of an object, of a class of objects, within a target image, the method comprising: initialising a set of feature points within the target image, each feature point corresponding to a predetermined feature for objects of the class of objects; deriving a set of template detectors, from the set of feature points, using a statistical model of the class of objects, each template detector comprising an area of image located about the location of a feature point for an object of the class of objects; comparing the set of template detectors with the target image; and updating the set of feature points within the target image in response to the result of the comparison.

Advantageously, a method of locating features of an object in accordance with the present invention gives more robust detection and better tracking for sequences of images, without incurring a significant increase in computational complexity compared with known techniques.

The term 'image' is intended to mean an image or a region of an image that is of interest. The locations of interest in the image may be selected regions, which are expected to provide information useful for identification.

The set of template detectors derived using said statistical model may collectively represent only part of the area of image containing the object of the class of objects.

The set of template detectors derived using said statistical model may collectively represent all of the area of image containing the object of the class of objects.

The method may further comprise repeating the steps of deriving the set of template detectors, from the updated set of feature points, comparing the set of template detectors with the target image and updating the set of feature points.

The method may further comprise after said step of updating the set of feature points: determining whether the average difference between the location of each updated feature point and its preceding location is below a predetermined threshold; and outputting the set of feature points as a final set of feature points if the average difference is below the threshold.

The method may further comprise generating the statistical model from a set of training images, each training image containing an object of the class of objects.

Said step of generating the statistical model comprises for each training image may further comprise: identifying a set of feature points within the training image corresponding to a predetermined feature of the object within the training image; and generating a set of templates, each template comprising an area of image within the training image located about an identified feature point.

Said step of identifying a set of feature points may further comprise a human operator identifying the set of feature points. Alternatively, said step of identifying a set of feature points may further comprise automatically identifying the set of feature points.

The method may further comprise generating from the sets of feature points for each training image in the set of training images a shape model representing the spatial distribution of feature points for the set of training images.

Said step of deriving a set of template detectors may further comprise: generating a set of templates for the target image, each template comprising an area of image located about a feature point within the target image; using the shape model to identify a subset of training images within the set of training images which have identified feature points closest to the set of feature points within the target image; correlating the set of templates for the target image with the set of templates for each training image within the subset of training images; selecting from the subset of training images the training image having a set of templates most correlated to the set of templates for the target image; and setting the set of templates for the selected training image as the set of template detectors.

The method may further comprise generating from the sets of feature points for each training image in the set of training images a shape model representing the spatial distribution of feature points for the set of training images; generating from the sets of templates for each training image in the set of training images a texture model representing the distribution of texture for the sets of templates within the set of training images; and combining the shape model and the texture model to form a combined shape and texture model.

Said step of deriving a set of template detectors may further comprise: generating a set of templates for the target image, each template comprising an area of image located about a feature point within the target image; using the combined shape and texture model to generate a modelled set of templates from the set of feature points and the set of templates for the target image; and setting the generated set of templates as the set of template detectors.

Said step of comparing the set of template detectors with the target image may further comprise: comparing each template detector with a respective area of the target image.

Said step of comparing the set of template detectors with the target image may further comprise: correlating each template detector separately with the target image at a series of positions about the corresponding feature point within the target image to generate a response image, such that a set of response images are formed; and using a non-linear optimisation to locate the positions of best correlation for each feature point, such that an updated set of feature points is generated, said updated set of feature points forming a valid set of feature points for objects of the class of objects.

Said step of initialising a set of feature points may further comprise: using a global object detector to identify an area of image within the target image containing the object; and initialising the set of feature points to mean feature point positions within the area of image identified by the global object detector.

Said step of initialising a set of feature points may further comprise: using a set of feature detectors to identify areas of image within the area of the target image identified using the global object detector containing each feature point; and initialising each feature point to a mean feature position within the area of image identified by the feature region detector.

The method may further comprise locating features of an object within a video sequence comprising a series of target images; initialising a set of feature points within the first target image; and initialising a set of feature points for subsequent target images using the updated feature points from the preceding target image.

The class of objects may comprise human faces.

According to a second aspect of the present invention there is provided a method of modelling the visual appearance of an object, of a class of objects, within a target image, the method comprising: initialising a set of feature points within the target image, each feature point corresponding to a predetermined feature for objects of the class of objects; deriving a set of template detectors, from the set of feature points, using a statistical model of the class of objects, each template detector comprising an area of image located about the location of a feature point for an object of the class of objects; comparing the set of template detectors with the target image; and updating the set of feature points within the target image in response to the result of the comparison.

According to a third aspect of the present invention there is provided a method of modelling the visual appearance of a human face, within a target image, the method comprising: initialising a set of feature points within the target image, each feature point corresponding to a predetermined facial feature; deriving a set of template detectors, from the set of feature points, using a statistical model of human faces, each template detector comprising an area of image located about the location of a facial feature; comparing the set of template detectors with the target image; and updating the set of feature points within the target image in response to the result of the comparison.

According to a fourth aspect of the present invention there is provided a carrier medium carrying computer readable code for controlling a computer to carry out the method described above.

According to a fifth aspect of the present invention there is provided a computer apparatus for locating features of an object, of a class of objects, within a target image the apparatus comprising: a program memory storing processor readable instructions; and a processor configured to read and execute instructions stored in said program memory; wherein the processor readable instructions comprise instructions controlling the processor to carry out the method described above.

According to a sixth aspect of the present invention there is provided an apparatus for locating features of an object, of a class of objects, within a target image, the apparatus comprising: means for initialising a set of feature points within the target image, each feature point corresponding to a predetermined feature for objects of the class of objects; means for deriving a set of template detectors, from the set of feature points, using a statistical model of the class of objects, each template detector comprising an area of image located about the location of a feature point for an object of the class of objects; means for comparing the set of template detectors with the target image; and means for updating the set of feature points within the target image in response to the result of the comparison.

BRIEF DESCRIPTION OF THE DRAWINGS

The present invention will now be described, by way of example only, with reference to the accompanying figures, in which.

DETAILED DESCRIPTION

Figure 1:
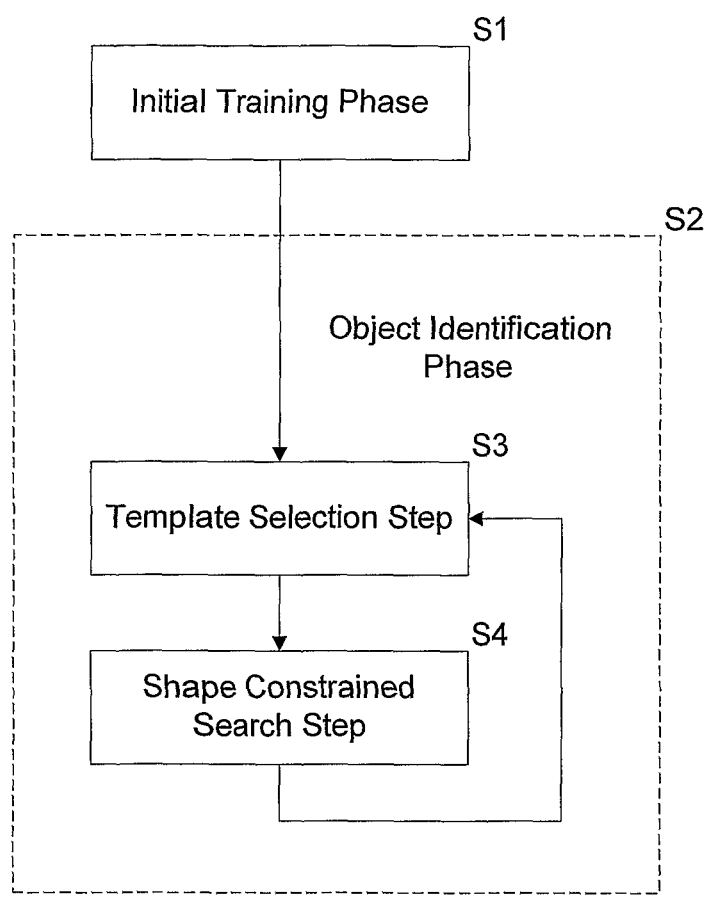
FIG. 1 is a flow chart of a method of locating features of an object in accordance with embodiments of the present invention.

In embodiments of the present invention described herein automatic locating of facial features, such as eye pupils or the corners of the mouth is provided for both static and video applications. Embodiments of the present invention have been shown to be more robust and more accurate than some prior art algorithms, when applied to human faces.

The prior art AAM uses statistical modelling of variation in intensity across an object in an image, after first warping the image to correct for shape variability. An appearance model represents image structure in regions of interest around the object. Typically, in the case of the AAM this is a 2D region covering all or part of the object.

The AAM involves a two-step process. Firstly, an appearance model is built for objects of a given class. Secondly, a target image is searched to locate objects of the same class of objects as the model. During both model building and image search, the image of interest is sampled over each region of interest. The sample values are placed in a vector representing the image structure in each region. The difference in texture between the model and the target image, i.e. the difference in image intensity at each point is used to predict improved model parameters to obtain the best possible match.

Embodiments of the present invention rely upon generating a set of template detectors, and using the template detectors to iteratively improve feature locations within a target image (for instance facial feature locations) from default positions towards the correct feature locations for the object within that target image. The set template detectors comprises a set of image patches, each image patch corresponding to a feature location. Each template detector is correlated to the target image in the area of the target image about the current position of its corresponding feature location.

Certain embodiments of the present invention are referred to herein as the Template Selection Tracker (TST) or the Templated Active Appearance Model (TAAM). These terms should not be interpreted as limiting the scope of the invention in any way. The scope of the invention is defined by the claims appended hereto, in the light of the description.

An embodiment of the present invention is now described in overview. The described method comprises two phases shown in FIG. 1.

During an initial training phase (step S1) a model is generated from a training set of example training images, each image representing an object of a class of objects. There may be of the order of 1000 images in the training set. These training images typically have manually labelled feature points defining corresponding features between the training images. In one embodiment of the invention, for which the object class is human faces, each image in the training set is manually labelled with 22 feature points corresponding to predetermined features (for instance the corners of the eyes and the corners of the mouth). In alternative embodiments of the present invention, the training images may be automatically labelled with feature points.

Around each feature point a normalised portion (or template) of image is sampled. The templates are sampled relative to a predetermined dimension of the object, for instance, for face images, the distance between the centres of the eyes, which accounts for scale variation between training set images. Texture information (i.e. pixel intensity variation across the templates) and shape information (i.e. the distribution of the feature points for each image) within the training set are used to generate the model.

During a second, object identification phase (step S2) attempts are made to fit the generated model to target images (i.e. images from the same object class, but not contained within the set of training images), thereby locating the positions of predetermined features for objects of the same class within the target image. Embodiments of the present invention attempts to locate the predetermined features within the target image automatically.

A first step of the image identification phase is to locate the object within the image. For faces, a standard face detector is used, such as the known Viola and Jones face detector described in Viola, P., Jones, M: "Rapid object detection using a boosted cascade of simple features", In.: Computer Vision and Pattern Recognition Conference 2001. Volume 1., Kauai, Hawaii (2001) 511-518, which is incorporated herein by reference.

Having applied the Viola and Jones face detector, the object identification phase comprises two sub-steps: the template selection step S3 and the shape constrained search step S4, both of which will be explained in greater detail with reference to specific embodiments of the present invention below.

The model generated by the initial training phase of step S1 is used to generate a set of feature template detectors for use in locating the actual feature points in a target image containing an object from the same object class, during the object identification phase of step S2 (as will be explained in greater detail below, with reference to specific embodiments of the present invention).

When the template detectors are applied to a target image a set of response surfaces (one per template detector) are generated. Each template detector is separately correlated to the target image at a range of locations about the current estimated feature location. Each response surface comprises at each pixel location about a current feature point the result of the correlation between the template detector for that feature point and the target image. The set of response surfaces are used to compute improved feature point locations using a non-linear optimisation technique, (for instance as described in D. Cristinacce and T. Cootes: "A comparison of shape constrained facial feature detectors" In $6^{th}$ International Conference on Automatic Face and Gesture Recognition 2004, Seoul, Korea, pages 375-380, 2004, which is incorporated herein by reference). The optimisation technique ensures that the feature points are subject to constraints imposed by modelled information about shape variation to ensure that the locations correspond to a "legal" example within the model.

The updated feature points are used as the current feature points to generate a new set of template detectors in the next iteration, or are output as the final feature points if they are found to lie close to feature points from the preceding iteration of the embodiment of the present invention Two embodiments of the present invention will now be described in further detail.

A first embodiment of the present invention is referred to as the Template Selection Tracker algorithm (TST). The TST algorithm uses a shape model generated from a set of training images and a set of templates learnt from a set of manually labelled face images during an initial training phase (as will be explained in more detail below). During the image identification phase the TST algorithm comprises two steps: a template selection step and a shape constrained search step.

During the template selection step the TST algorithm attempts to fit the shape model to the target image using current feature points of the target image. For a new target image, the feature points are initialised to default positions. Euclidean distance in the shape space is used to perform a nearest neighbour search of the training example images. That is, the current feature points of the target image are compared sequentially to each image within the training set to identify a subset of training images that have the closest spatial correlation to the current feature points of the target image. The subset of training images may be approximately 20 training images. The subset of training images selected by shape is correlated with the current target image to select the closest template texture match from the training set. That is, the texture templates for each of the subset of training images are correlated to the target image templates to identify which of the training images has the closest textural match to the target image.

Once the closest matching training image has been identified, the templates for that training image are used as the template detectors when searching for the feature points within the target image. The template detectors are correlated to the target image, using normalised correlation, in the shape constrained search step to improve the current feature points of the target image. The shape constrained search step is similar to that described within D. Cristinacce and T. Cootes: "A comparison of shape constrained facial feature detectors", In $6^{th}$ International Conference on Automatic Face and Gesture Recognition 2004, Seoul, Korea, pages 375-380, 2004, which is incorporated herein by reference.

In the searching method described in the above referenced paper feature templates are fixed during the search. However, in the described embodiment of the present invention, an iterative scheme is implemented, in which appropriate template detectors are generated given the current feature points and the target image. Furthermore, instead of the shape model parameters being constrained using hard limits the shape model parameters are constrained by adding a soft penalty term to the non-linear optimisation function. The soft penalty term discourages shapes, which have a low probability of occurrence according to the statistical shape model.

The searching method is also related to the Active Shape Model. However, again, the ASM uses fixed templates and only uses the shape model to update the feature points after computing the best match of each detector, instead of utilising the whole response surface for each detector.

The template detectors are incrementally moved about the regions of the target image surrounding each template detector's respective feature point. The normalised correlation generates a set of response surfaces. The quality of fit of the model (i.e. the accuracy of the locations of the current feature points relative to the true feature points within the target image) is optimised using a known method. Specifically, the quality of fit of the model is optimised using the Nelder-Mead simplex algorithm, (described within J. A. Nelder and R. Mead: "A simplex method for function minimization", Computer Journal, 7:308-313, 1965, which is incorporated herein by reference). The Nelder-Mead simplex algorithm drives the parameters of the shape model in order to maximise the sum of responses at each point, i.e. locating the positions of the strongest correlation between the target image and each of the template detectors. This generates a new, improved, set of feature points for the target image. If the current feature points have converged to stable locations within the target image then the process ends. If not, then new template detectors are generated in a new template selection step.

When first presented with a target image containing a face, a Viola and Jones face detector is used to find a face within the target image as described above. Within the detected face region smaller Viola and Jones feature detectors, constrained using the Pictorial Structure Matching (PSM) approach described within Felzenszwalb, P., Huttenlocher, D: "Pictorial structures for object recognition" International Journal of Computer Vision 61 (2005) which is incorporated herein by reference are used to compute initial estimated feature locations.

The Template Selection Tracker algorithm will now be described in further detail.

In order to build a joint shape and texture model (at step S1 of FIG. 1) a training set of images must first be labelled with a number of feature points. FIG. 2 shows four example images from a training set. The training set comprises a large number (for instance 1052) of training images containing faces. The training images may be taken at a range of angles and under a range of lighting conditions. Each training image 1 is labelled with feature points 2 (shown with white crosses), corresponding to identifiable facial features.

A statistical shape model is built up from the training set using the known method described within T. Cootes, G. J. Edwards, and C. J. Taylor: "Active appearance models", In 5th European Conference on Computer Vision, pages 484-498. Springer, June 1998, which is incorporated herein by reference. Each training image is represented by an n-dimensional shape vector x formed by concatenating the coordinates of each feature point within the training image. Using Principal Component Analysis (PCA) each shape vector x can be approximated by a linear model of the form:

$$x = \bar{x} + Pb \quad b = P^T(x - \bar{x}) \tag{1}$$

$\bar{x}$ is the mean shape, P is a set of orthogonal modes of shape variation and b is a set of shape parameters for each training image. This provides a parameterisation b of shapes similar to the training set. The shape model parameter b can be estimated for new shapes using the transpose matrix $p^T$.

New examples of the class of objects (i.e. new faces in the present example) can be generated by choosing values of b within the range found in the training set.

For each image in the training set shown in FIG. 2, a rectangular template is drawn around each labelled feature point. The templates contain texture (i.e. intensity variation) information for the image in the localised area about each feature point. The templates are normalised for scale (such as by normalising relative to a normalised distance between the centres of the eyes). The average intensity of each template may also be normalised to account for variation in the lighting conditions under which the images are recorded. The feature templates are computed for each training image and stored alongside the corresponding shape model parameters b for that training image.

Figure 2:
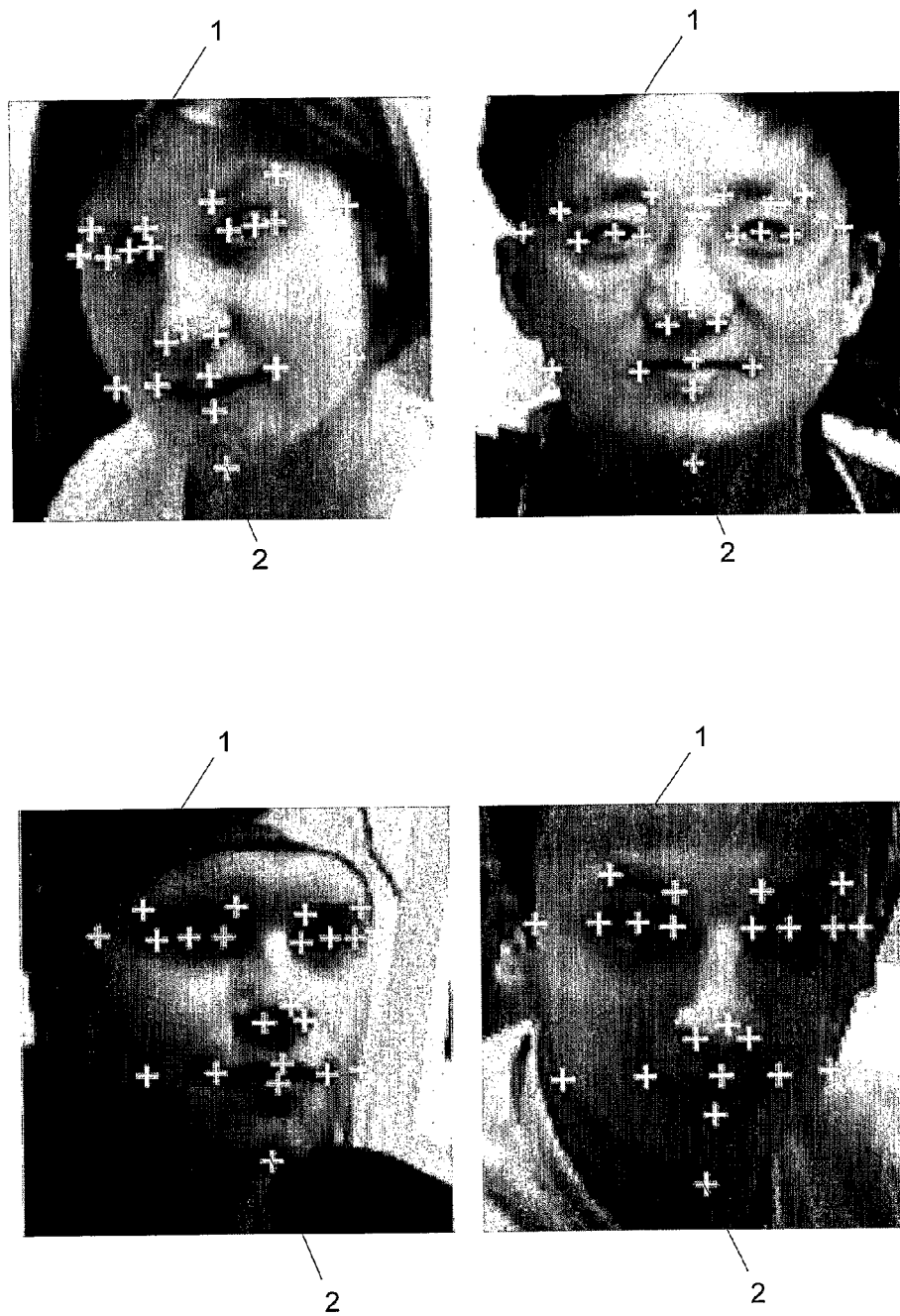
FIG. 2 illustrates four example images from a set of training images used to generate a statistical model in accordance with embodiments of the present invention.
Figure 3:
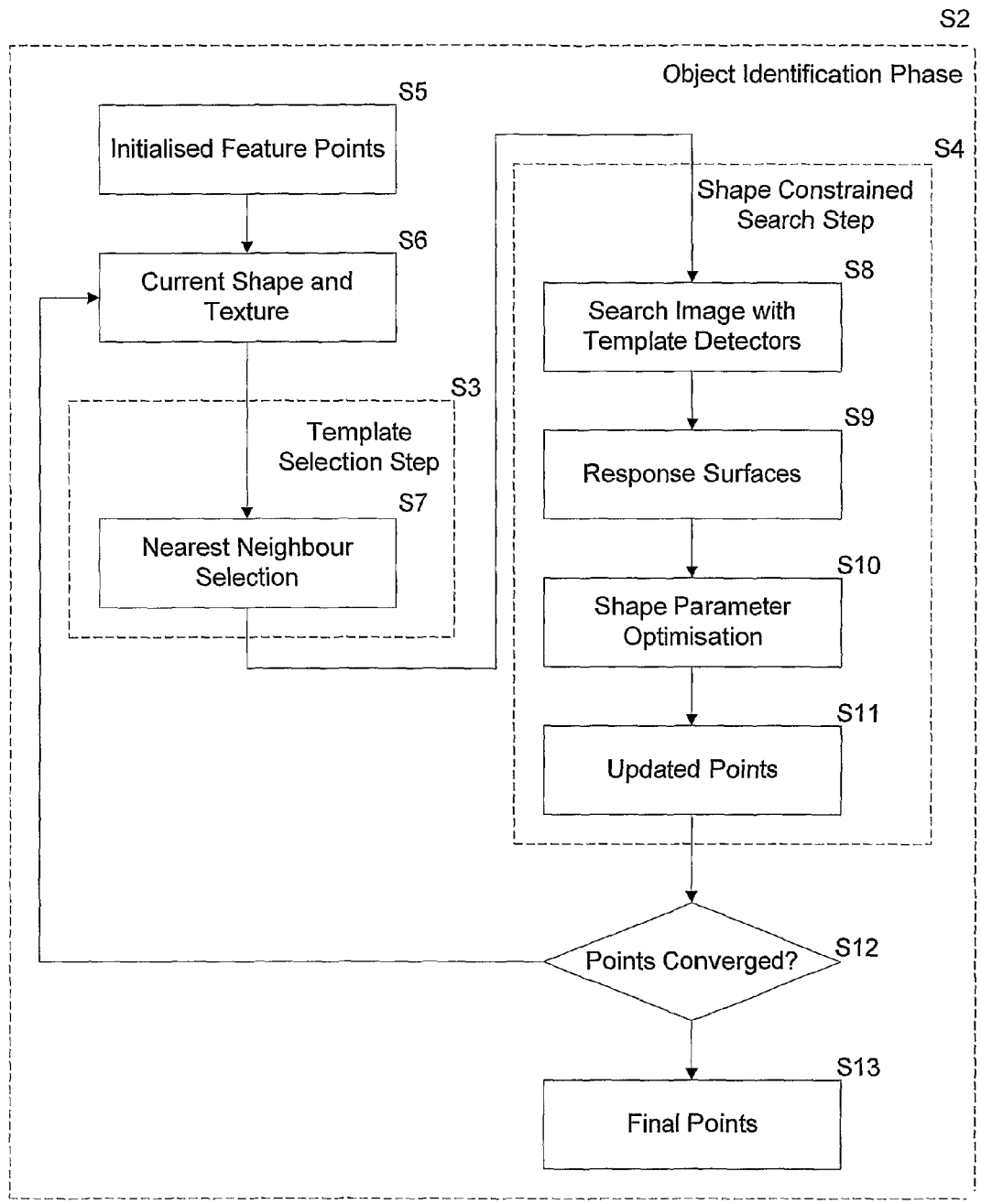
FIG. 3 schematically illustrates in the form of a flow chart the method of locating features within a target image in accordance with a first specific embodiment of the present invention.

The object identification phase of step S2 of FIG. 1 is schematically illustrated in the flow chart of FIG. 3. At the beginning of the object identification phase S2 a target image (i.e. a new image, not contained within the training set, containing an object of the same class as the training set—in this case faces) is identified. The Viola and Jones face detector described above can be used to identify a region of the target image containing the object.

The object identification phase is an iterative process (as discussed above) in which the feature points are iteratively improved by cycling through the template selection step S3 and the shape constrained search step S4. Initially, the target image must be given arbitrary starting feature points at step S5. The starting points may be mean feature points relative to the region detected by the Viola and Jones face detector (learnt by applying the face detector to a manually labelled set of verification images), or they may be any other default positions. Alternatively Viola and Jones detectors trained on individual facial features (as opposed to the whole face region) can be used to provide initial starting points. For applications in which faces are tracked from one frame to the next in a video sequence, the starting points may be the final feature points for the last frame (except for the first frame, which requires initialising with default feature points).

At step S6 the shape information of the current (i.e. initially default) feature points on the target image and the texture information within the templates around each feature point are sampled. The process then passes to the template selection step S3.

The template selection step S3 for the TST algorithm comprises a nearest neighbour selection step S7. Given the current feature points and texture from step S6, a set of likely feature templates can be generated using a nearest neighbour search of the training images within the training set. The shape model is fitted to the current feature points to obtain the current shape parameters b. These parameters are then compared with the stored shape parameters b for each of the images within the training set. The K closest matching shapes from the training set are selected using the Euclidean distance in the shape space. In this way, the training set is first reduced to a sub-set of training images by comparing the shape information for each training image to the current feature points in the target image.

The top K training images selected by the shape model are then tested by comparing the texture templates for each training image against the texture templates for the feature points obtained from the target image in step S6 using normalised correlation. This process selects the training image from the sub-set of training images whose templates most closely match the templates around the current feature points in the target image. The best matching training image templates from the subset of K training images are then used to provide template detectors for each facial feature, for use in the shape constrained search step S4.

Given initial (or, in subsequent iterations, current) feature points, some of which may lie close to the true feature location for the target image, this simple nearest neighbour search will generate a likely candidate set of template detectors from the templates in the training set (i.e. a set of templates taken from a single image).

The parameter K (the number of training images in the subset identified from the full training set by the shape model) needs to be set. For a training set of 1052 training images K=20 has been found to provide good results.

The template detectors selected in the template selection step S3 from the training set are used in the shape constrained search step S4 to improve the position of the current feature points in the target image. The template detectors are applied to the target image at step S8 to compute a set of response surfaces (one for each feature) at step S9. Each template detector is systematically scanned across a region around the current feature point corresponding to that detector. Normalised correlation between the feature template detector and the target image (at each position of the template detector) provides a response value. The response values are stored in the response surface image for each template detector. After each template detector has been applied to the target image, this provides the set of response surfaces.

The shape parameter optimisation step (S10) aims to fit a shape model to the current feature points and vary the shape parameters in order to select shape parameters which represent feature point locations with high response surface values, but still representing "legal" shape configurations.

Let $(X_i, Y_i)$ be the position of feature point i in the target image (where i is an index) and $I_i(X_i, Y_i)$ be the value of the response image of the $i_{th}$ feature template at that point. The positions can be concatenated into a vector X:

$$X = (X_1, \ldots, X_n, Y_1, \ldots, Y_n)^T \tag{2}$$

The statistical shape model is fitted to the target feature points X using the technique described within T F Cootes, A Hill, C J Taylor and J Haslam: "The use of active shape models for locating structures in medical images", Image and Vision Computing 12(6): 276-285, July 1994.

The shape model fitting provides shape model parameters b and a transformation $T_t$ from the shape model frame to the target image frame. The transformation $T_t$ is a similarity transform (i.e. restricted to scale, translation and rotation) with parameters t.

X can be approximated from the shape parameters b and the similarity transformation $T_t$ as follows to produce a new set of feature points X:

$$X = T_t(\bar{x} + Pb) \tag{3}$$

If the starting parameters of X are well represented by the statistical model then X≈X'. The parameters of the similarity transform t and the shape parameters b are concatenated to form one combined vector p.

$$p = (t^T | b^T)^T \tag{4}$$

Therefore, sets of feature points in the target image X' with pre-computed response surfaces $I_i(X_i, Y_i)$ can be represented as a function of p. Given the initial starting value for p, the search proceeds by optimising a function f(p) based on the image response surfaces $I_i$ and the statistical shape model learnt from the training set. The function used is:

$$f(p) = \sum_{i=1}^{n} I_i(X_i, Y_i) + R \sum_{j=1}^{s} \frac{-b_j^2}{\lambda_j} \quad (5)$$

The second term is an estimate of the log-likelihood of the given shape parameters $b_j$ and Eigen-values $\lambda_j$, where log-likelihood is a measure of the plausibility of the given shape represented by b according to the statistical shape model and assuming that the shape parameters $b_j$ are independent and Gaussian distributed. The parameter R is a weighting determining the relative importance of plausible shape and quality of correlation between the template detectors and the target image. For example, for R=0 the function ignores shape and selects any configuration of features. For larger values of R, plausible shape configurations will be favoured instead of high quality detector responses. A sensible value of R can be determined by computing the ratio of the first and second terms of f(p) when applied to a verification set of images with manually labelled feature points (similar to the training set images shown in FIG. 2).

Equation 5 is optimised at step S10 using the known Nelder-Meade simplex algorithm mentioned above.

Equation 5 differs from the objective function previously used in known shape constrained facial feature detectors, which used hard limits on the shape parameters $b_j$. Using hard limits has the advantage of avoiding the need for a trade off between shape and feature responses. However, using hard limits is capable of allowing unlikely shapes (e.g. if all of the shape parameters $b_j$ are close to their individual limits), which is disadvantageous.

In certain embodiments of the invention, an added refinement is the use of distance transforms to smooth the response surfaces. Distance transforms when applied to template detector responses allow for deformable shape variation between pairs of feature detectors as described within P Felzenszwalb, D Huttenlocher: "Pictorial structures for object recognition", International Journal of Computer Vision, 61 (2005), which is incorporated herein by reference. The smoothing of the response images helps the optimisation of Equation 5 avoid false minima and also accounts for the residual variation of the shape model. The shape variation that is unaccounted for by the shape model is taken account of by the distance transform.

The result of the optimisation of Equation 5 at step S10 is a set of updated feature points at step S11 for the target image. At decision step S12 the updated points from step S11 are checked for convergence using a threshold on the point movement compared to the previous iteration. That is, if the feature points have not moved significantly, then they are deemed to have converged. If the feature points for the target image have converged then the updated points from step S11 are output from the TST algorithm as the final points at step S13. If the feature points have not converged then the updated points from S11 are stored as the current feature points at S6 and new templates from the target image are selected about the current feature points. The template selection step then runs again.

A second example embodiment of the present invention is similar in many respects to the first example embodiment. Therefore, in general, only differences in the algorithm will be explained in detail, with reference made to the description above for areas of commonality.

The second embodiment of the present invention is referred to herein as the Templated Active Appearance Model (TAAM).

The TAAM algorithm is related to the known Active Appearance Model. A first important difference is that a TAAM model comprises a combined model of shape and texture variation in an image portion (or template) located about each feature point. Intensity and shape information for each one of the training images may be loaded into a vector, which is then used to generate the model. In alternative embodiments of the present invention such as the TST this step does not occur.

Conversely, the AAM algorithm generates a model from shape and texture variation over the whole object region. The AAM algorithm, for the example of modelling faces, splits the face into a series of triangles located between the feature points and then models shape and texture variation across the whole of each triangle. Whereas the TAAM algorithm generates likely feature templates, the AAM algorithm attempts to approximate the image pixels for the whole object region.

The model is fitted to a target image in an iterative manner by generating new template detectors using the joint model. The current parameter estimates for the target image (rather than selecting actual templates from the training set to use as template detectors as for the TST embodiment of the present invention). As for the TST first embodiment of the invention, the template detectors are correlated to the target image to generate response images and the shape parameters are optimised so as to maximise the sum of responses.

Figure 4:
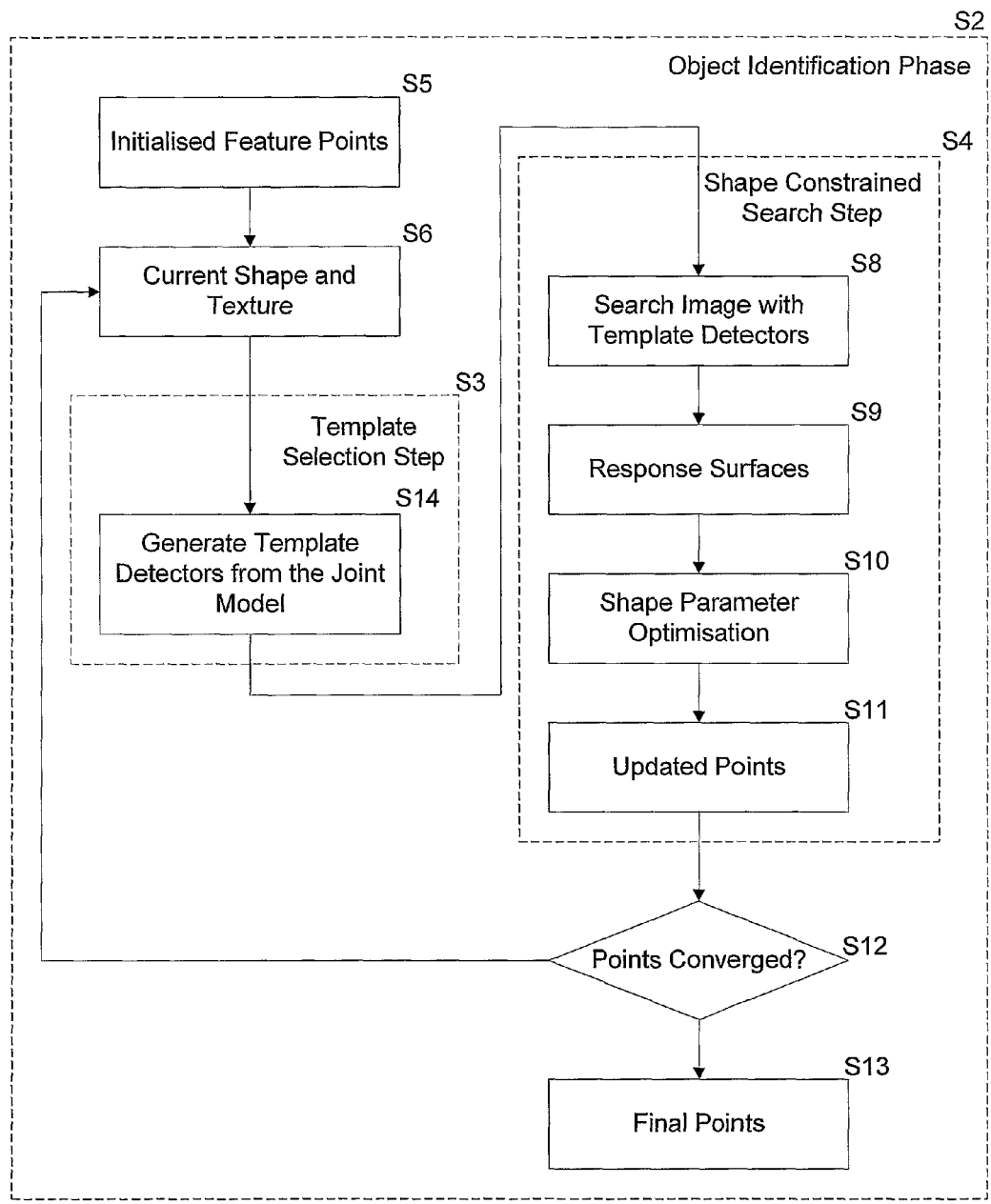
FIG. 4 schematically illustrates in the form of a flow chart the method of locating features within a target image in accordance with a second specific embodiment of the present invention.

The second embodiment of the present invention is schematically illustrated in the form of a flow chart in FIG. 4. Steps that are equivalent to those for the first embodiment of the present invention are given the same numbers as for FIG. 3 and are not described in detail.

Unlike the first embodiment of the invention, during the template selection step S3 instead of performing a nearest neighbour selection to identify the single closest image within the training set, the second embodiment uses the shape and texture model to generate new image templates for use as template detectors in the shape constrained search step S4.

The template generation method is related to a known technique described in N Dowson, R Bowden: "Simultaneous modelling and tracking (SMAT) of feature sets", international Conference on Computer Vision and Pattern Recognition, San Diego, USA, June 2005, which is incorporated herein by reference. However, the SMAT technique models the feature appearance using a Gaussian mixture model, which is built at run time, instead of using offline data. The template detectors are updated, given the previous matched frames of the tracker, and therefore require an accurate initialisation. SMAT also builds a Gaussian mixture model of shape configurations and uses this to limit the cases in which the feature template model can be updated. The TAAM approach combines shape and texture explicitly to provide a robust search template generation method, which cannot generate illegal examples.

Once the template detectors have been generated, these are correlated to the target image using normalised correlation in the shape constrained search step as for the first embodiment of the invention to improve the locations of the feature points.

As for the first embodiment of the present invention, when first presented with a target image containing a face, a Viola and Jones face detector can be used to find the face in the image. Within the detected face region Viola and Jones feature detectors trained on individual facial features (as opposed to the whole face region) can be used to provide initial feature points in step S5. These feature points are then refined using a similar method to that disclosed above for the first embodiment of the invention.

The TAAM algorithm will now be described in further detail.

As for the first embodiment of the present invention, in order to build a joint shape and texture model a training set of images must first be labelled with a number of feature points (either manually or automatically) as shown in FIG. 2.

As before, a statistical shape model is built up from the training set using the known method. Each training image is represented by an n-dimensional shape vector x formed by concatenating the coordinates of each feature point within the training image. Using Principal Component Analysis (PCA) each shape vector x can be approximated by a linear model of the form:

$$x = \bar{x} + P_s b_s \quad (6)$$

$\bar{x}$ is the mean shape, $P_s$ is a set of orthogonal modes of shape variation and $b_s$ is a set of shape parameters for each training image.

New examples of the class of objects (i.e. new faces) can be generated by choosing values of $b_s$ within the range found in the training set.

Figure 5:
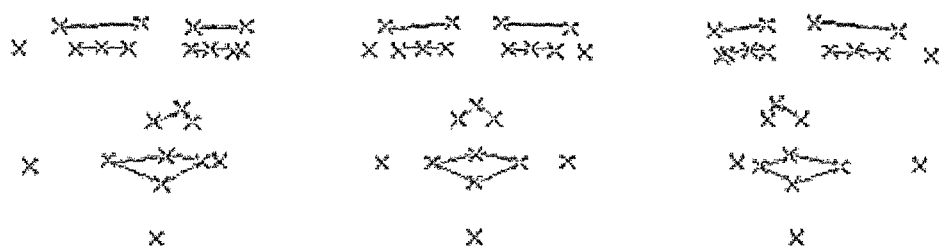
FIG. 5 schematically illustrates modes of variation for a shape model in accordance with the embodiment of FIG. 4.
Figure 5:
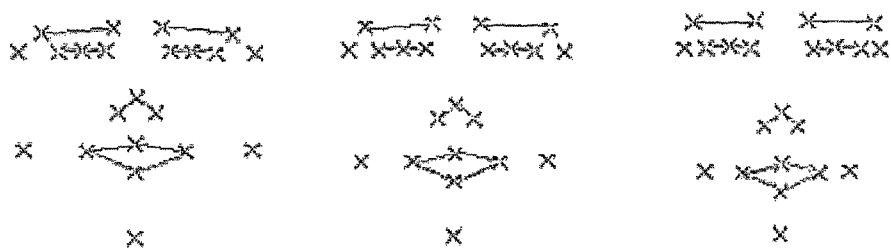

The first two modes of variation of the shape model, produced by varying the first two elements of $b_s$ are shown in FIG. 5. It can be seen that varying one of the first two modes of variation of the shape model within +/−3 standard deviations of the mean values produces significant distortions in the shape.

For each image in the training set shown in FIG. 2 a rectangular template is drawn around each labelled feature point. The templates contain texture (i.e. intensity variation) information for the image in the localised area about each feature point. The face region from each training image is first re-sampled to a fixed size rectangle to allow for scale changes between the training images. Each template is normalised such that the pixel values have a mean of zero and unit variance. The template patches from a given training image are then concatenated to form a single grey value vector. This set of training vectors is used to construct a linear model of the grey level texture variation using principle component analysis, as for the shape model:

$$g = \bar{g} + P_g b_g \quad (7)$$

Figure 6:
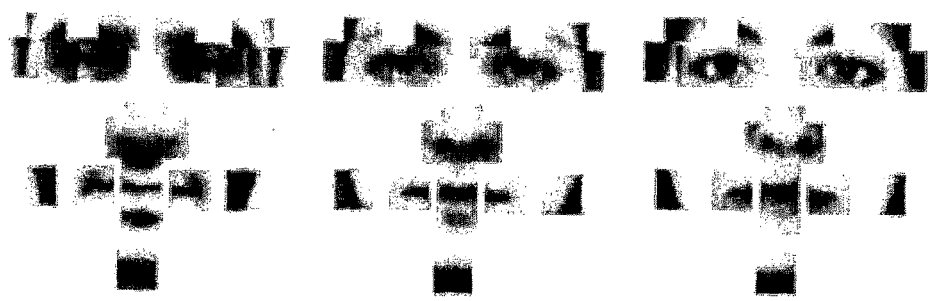
FIG. 6 schematically illustrates modes of variation for a texture model in accordance with the embodiment of FIG. 4.
Figure 6:
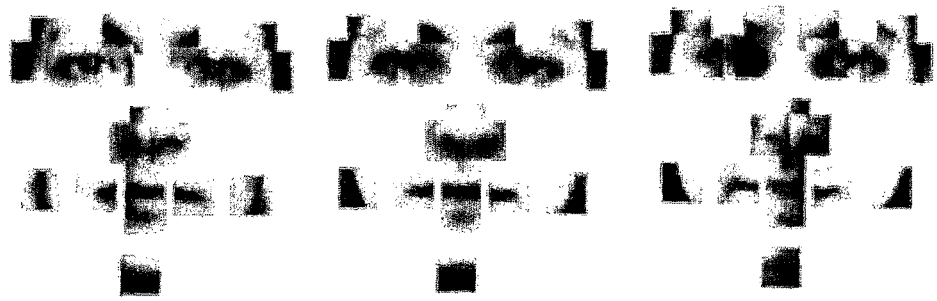

$\bar{g}$ is the mean normalised grey level vector, $P_g$ is a set of orthogonal modes of variation and $b_g$ is a set of grey-level parameters for each training image. The first two modes of variation of the texture model, produced by varying the first two elements of $b_g$ are shown in FIG. 6. It can be seen that varying one of the first two modes of variation of the shape model within +/−3 standard deviations of the mean values produces significant distortions in the template textures.

The shape and template texture models are combined using a further principle component analysis step to produce one joint model. The joint model has the following form:

$$b = P_c c \text{ where } P_c = \begin{pmatrix} P_{cs} \\ P_{cg} \end{pmatrix} \text{ and } b = \begin{pmatrix} W_s b_s \\ b_g \end{pmatrix} \quad (8)$$

b is the concatenated shape and texture parameter vector, with a suitable weighting $W_s$ to account for the difference between shape and texture units. c is a set of joint appearance parameters for each training image. $P_c$ is the orthogonal matrix computed using PCA, which partitions into two separate matrices $P_{cs}$ and $P_{cg}$, which together compute the shape and texture parameters given a joint parameter vector c.

For a given set of joint parameters c a set of templates with texture g and shape x can be computed as follows:

$$x = \bar{x} + P_s W_s^{-1} P_{cs} c$$

$$g = \bar{g} + P_g P_{cg} c \quad (9)$$

Figure 7:
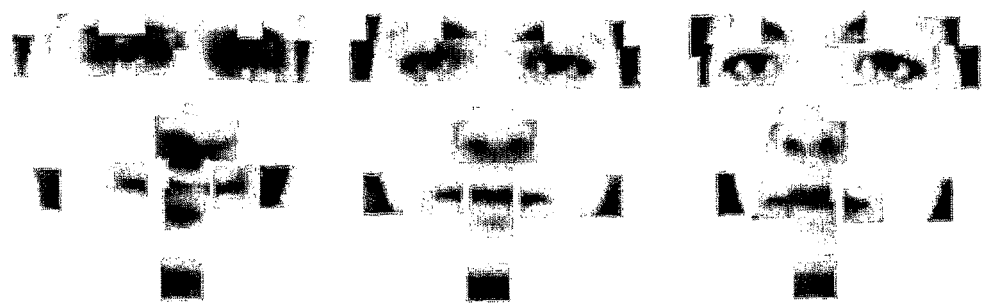
FIG. 7 schematically illustrates modes of variation for a combined shape and texture model in accordance with the embodiment of FIG. 4.
Figure 7:
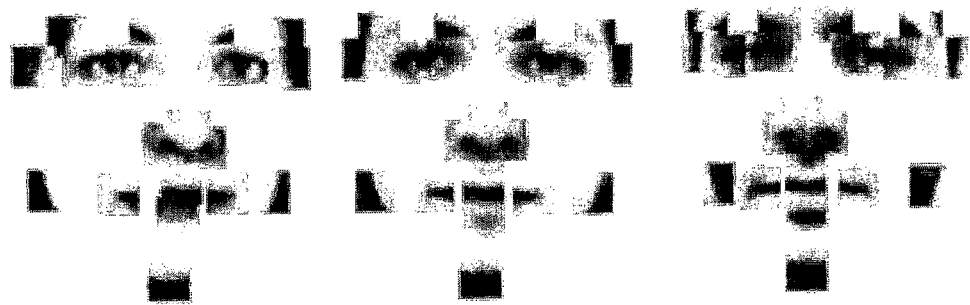

The first two modes of variation of the joint appearance model, produced by varying the first two elements of c are shown in FIG. 7. It can be seen that varying one of the first two modes of variation of the joint appearance model within +/−3 standard deviations of the mean values produces significant distortions in the template textures and the shape.

The object identification phase S2 is for the TAAM algorithm in accordance with an embodiment of the present invention is schematically illustrated in the flow chart of FIG. 4. As for the first embodiment of the present invention, the beginning of the object identification phase S2 an target image (i.e. a new image, not contained within the training set, containing an object of the same class as the training set—in this case faces) is identified. The object identification phase is an iterative process (as discussed above) in which the feature points are iteratively improved by cycling through the template selection step S3 and the shape constrained search step S4. Initially, the target image must be given arbitrary starting feature points at step S5 as described above.

At step S6 the shape information of the current (i.e. initially default) feature points on the target image and the texture information within the templates around each feature point are sampled. The process then passes to the template selection step S3.

The template selection step S3 for the TAAM algorithm comprises generating template detectors from the joint model (step S14). Given the joint model and an target image with an initial set of default feature points from step S6, the joint model can be fitted to the image by estimating the shape, texture and joint parameters as shown in Equation 10:

$$b = \begin{pmatrix} W_s P_s^T (x - \bar{x}) \\ P_g^T (g - \bar{g}) \end{pmatrix} \text{ and } c = P_c^T b \quad (10)$$

Given the joint parameters c, a set of template detectors with a shape approximating the current feature points can be computed using Equation 9.

The template detectors generated in the template selection step S3 are used in the shape constrained search step S4 to improve the position of the current feature points in the same way as for the first embodiment of the present invention. The template detectors are applied to the target image at step S8 to compute a set of response images (one for each feature) at step S9. The process is as follows:

Let $(X_i, Y_i)$ be the position of feature point i in the target image (where i is an index) and $I_i(X_i, Y_i)$ be the value of the response image of the $i_{th}$ feature template at that point. The positions can be concatenated into a vector X:

$$X = (X_1, \ldots, X_n, Y_1, \ldots, Y_n)^T \quad (11)$$

As for the first embodiment, the model is then fitted to the target feature points X. This provides shape model parameters b and a transformation $T_t$ from the shape model frame to the target image frame.

X can be approximated from the shape parameters b and the similarity transformation $T_t$ to produce a new set of feature points X':

$$X' = T_t(\bar{x} + Pb) \quad (12)$$

The parameters of the similarity transform $T_t$ and the shape parameters b are concatenated into vector p:

$$p = (t^T | b^T)^T \quad (13)$$

Therefore, X can be represented as a function of p. Given a starting value for p, the search proceeds by optimising a function f(p) based on the image response surfaces $I_i$ and the statistical shape model learnt from the training set. The function used is:

$$f(p) = \sum_{i=1}^{n} I_i(X_i, Y_i) + R \sum_{j=1}^{s} \frac{-b_j^2}{\lambda_j} \quad (14)$$

The second term is an estimate of the log-likelihood of the given shape parameters $b_j$ and Eigen-values $\lambda_j$. It is assumed that the shape parameters $b_j$ are independent and Gaussian distributed. The parameter R is a weighting determining the relative importance of plausible shape and quality of correlation between feature detectors and the target image. The value of R can be determined by computing the ratio of the first and second terms of f(p) when applied to a verification set of images with manually labelled feature points.

Equation 14 is optimized at step S10 using the known Nelder-Meade simplex algorithm mentioned above.

The result of the optimisation of Equation 5 at step S10 is a set of updated feature points at step S11 for the target image. At decision step S12 the updated points from step S11 are checked for convergence using a threshold on the point movement compared to the preceding iteration. If the feature points for the target image have converged then the updated points from step S11 are output from the TST algorithm as the final points at step S13. If the feature points have not converged then the updated points from S11 are stored as the current feature points at S6 and the template selection step runs again.

The ability of the above-described embodiments of the present invention to accurately locate facial features has been tested by applying the TST algorithm and the TAAM algorithm to two publicly available data sets. For comparison purposes, the known AAM algorithm has also been applied to the two data sets. The data sets both contain a series of images containing faces. These data sets are completely independent of the training set of images used within the initial training phase S1 to generate both the TST model and the TAAM model. The first data set used for testing is the BIOID data set described in O Jesorsky, K J Kirchberg and R W Frishholz: "Robust face detection using the hausdorff distance", $3^{rd}$ International Conference on Audio- and Video-Based Biometric Person Authentication, 2001. The second data set used is the XM2VTS data set described in K Messer, J Matas, J Kittler, J Luettin and G Maitre: "Xm2vtsdb: the extended m2vts database", Proc. $2^{nd}$ Conference on Audio- and Video-Based Biometric Personal Verification, Springer Verlag, 1999.

In order to assess the relative feature localisation accuracy a readily measurable distance metric is used. The parameter is a function of the distance from each automatically located feature point to each feature point's corresponding manually labelled correct position. The distance metric is calculated according to Equation 15:

$$m_e = \frac{1}{ns} \sum_{i=1}^{i=n} d_i \quad (15)$$

$d_i$ is the distance from an automatically located feature point to that feature point's corresponding manually labelled correct position. s is the inter-ocular distance between the left and right pupils, calculated from the manually labelled target image chosen from the data set. Dividing by s is necessary in order to normalise the distance metric to account for variation in size of the face objects in images within the data sets. n is the number of feature points. For testing using the BIOID and the XM2VTS data sets, n is 17. For the purposes of these tests only feature locations internal to the face (around the eyes, nose and mouth) are used to compute the distance metric. Feature points around the outside of the face, as shown in FIG. 2, are not used.

The testing procedure used to generate the initial feature points (S5) for a static image is to apply the Viola and Jones face detector described above, and then to apply similar smaller region detectors within the detected face region. The smaller region detectors are constrained using the Pictorial Structure Matching (PSM) approach. This generates a set of points from which to initialise both the TST and TAAM algorithms, and also the comparison AAM algorithm. The TST and TAAM algorithms were tested separately.

For the TST algorithm, five different procedures were evaluated:
   AVG—the distance metric for each image within the data set is calculated simply using the initial feature points calculated using on the global Viola and Jones face detector.
   PSM—the distance metric for each image within the data set is calculated using the PSM matching points found within the Viola and Jones face region using the smaller region detectors.
   AAM—the distance metric for each image within the data set is calculated using the AAM algorithm, initialised using the PSM matching points.
   TST fixed—the distance metric for each image within the data set is calculated using the TST algorithm, initialised using the PSM matching points, but restricted to using fixed template detectors (using the mean templates of the training set). This gives an indication of the ability of the TST algorithm to locate feature points without iteratively updating the texture of the templates.
   TST—the distance metric for each image within the data set is calculated using the TST algorithm, initialised using the PSM matching points, this time allowing the set of templates to be updated during each iteration.

Figure 8A:
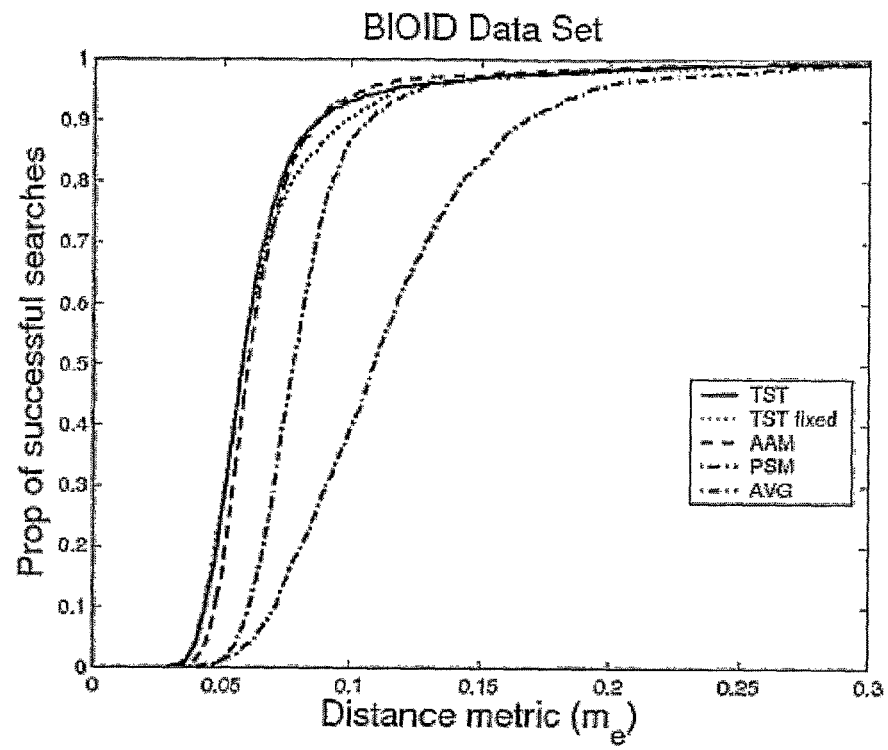
FIGS. 8a and 8b illustrate the performance of the embodiment of FIG. 3 at localising feature points for static images, relative to the performance of known methods of localising feature points for static images, the images being drawn from first and second publicly available data sets respectively.
Figure 8B:
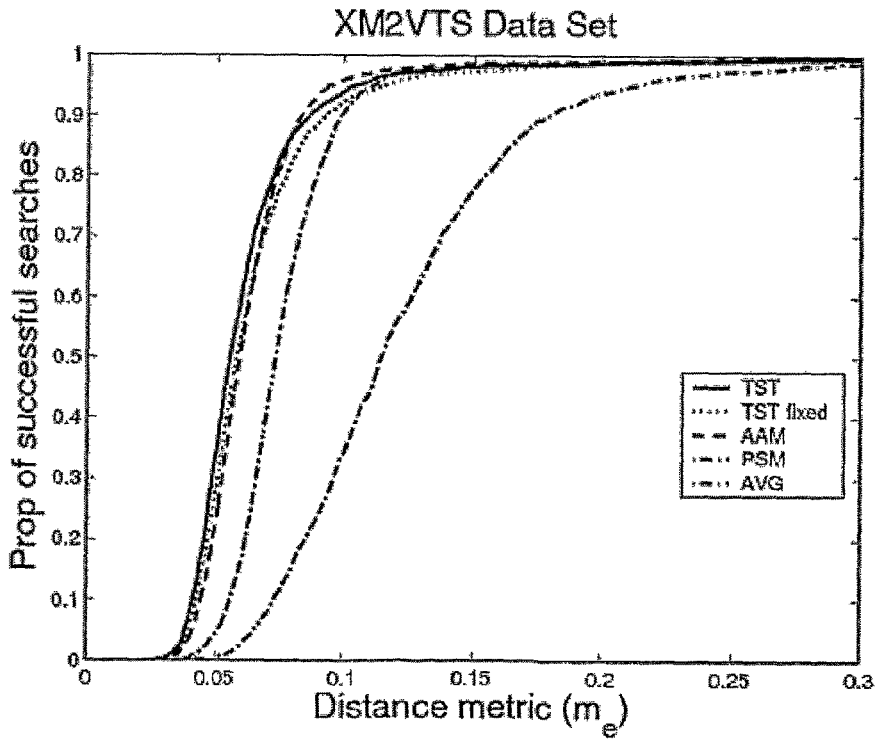

The results of applying each of these procedures to the BIOID and the XM2VTS data sets respectively are shown in FIGS. 8a and 8b. For each data set, and for each of the above five procedures, the proportion of images within the training set for which the feature points have been located to within a given distance metric is plotted against distance metric.

For the TAAM algorithm, the same first three procedures (AVG, PSM and AAM) were evaluated for each data set, along with:
   TAAM fixed—the distance metric for each image within the data set is calculated using the TAAM algorithm, initialised using the PSM matching points, but restricted to using fixed template detectors (using the mean templates of the training set). This gives an indication of the ability of the TAAM algorithm to locate feature points without iteratively updating the texture of the templates.

TAAM—the distance metric for each image within the data set is calculated using the TAAM algorithm, initialised using the PSM matching points, this time allowing the set of templates to be updated during each iteration.

Figure 9A:
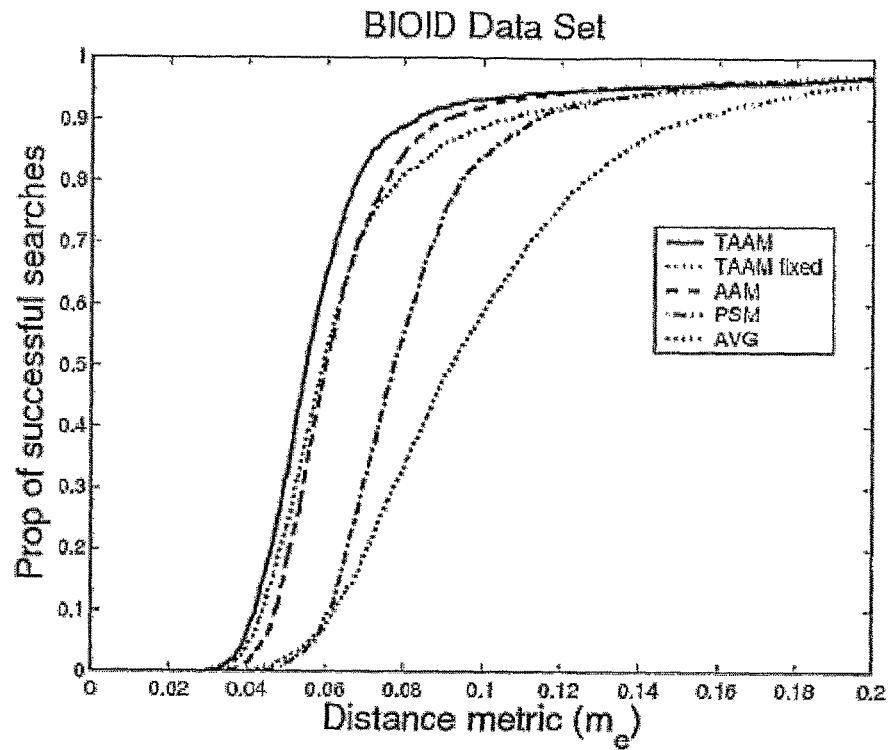
FIGS. 9a and 9b illustrate the performance of the embodiment of FIG. 4 at localising feature points for static images, relative to the performance of known methods of localising feature points for static images, the images being drawn from first and second publicly available data sets respectively.
Figure 9B:
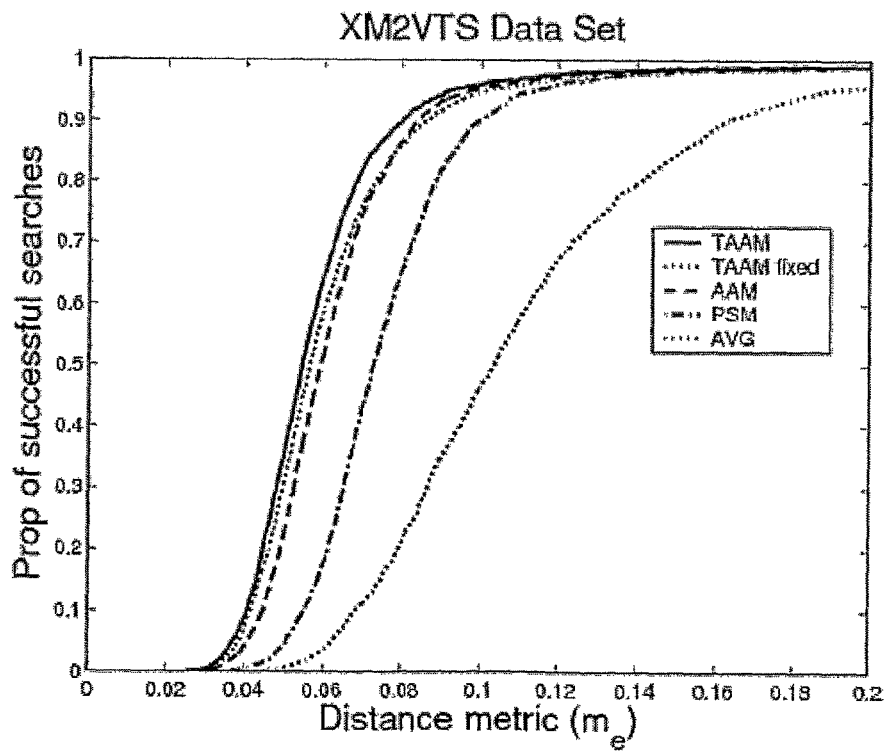

The results of applying each of these procedures to the BIOID and the XM2VTS data sets respectively are shown in FIGS. 9a and 9b, which correspond to FIGS. 8a and 8b.

FIGS. 8a, 8b, 9a and 9b indicate that the least successful procedure for both datasets was the simple average feature points from the global face detector, with no localised searching for the individual feature points (AVG line). Given the detected face region, the feature point localisation accuracy is improved for both data sets using the smaller region detectors with the PSM constraint method (PSM line).

All four graphs show similar trends. The best performing procedures are the TST and TAAM, having updated templates each iteration. The success rate of the TST algorithm is greater than the AAM algorithm at distance metric values $m_e < 0.075$. Above this value the AAM algorithm is slightly more successful. Using the TST algorithm with fixed templates performs reasonably well (and has the advantage of being less computationally expensive), but always has a lower success rate compared to the full TST algorithm.

The TAAM algorithm performs better than the AAM algorithm for all values of me. As for the TST algorithm, the TAAM algorithm with fixed templates performs reasonably well, but always has a lower success rate compared to the full TST algorithm.

Figure 10:
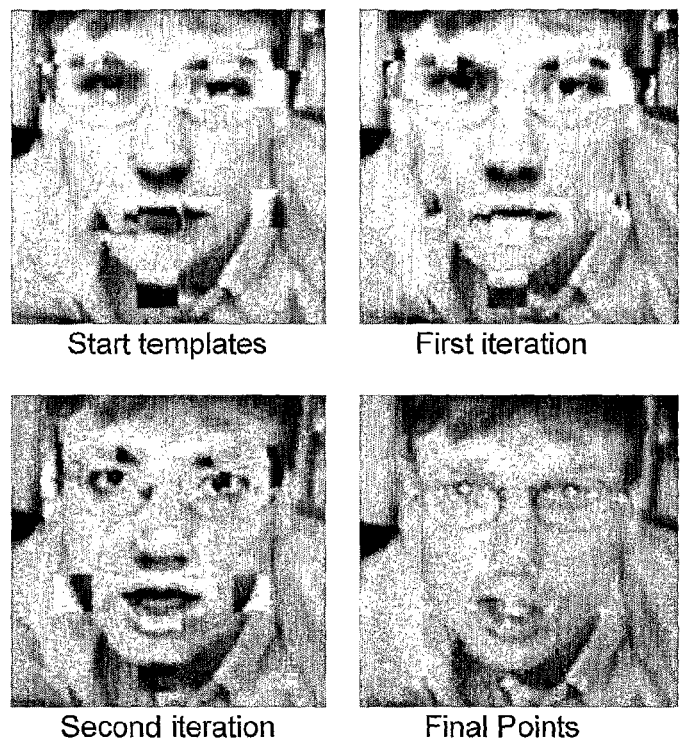
FIG. 10 schematically illustrates template detectors for the embodiment of FIG. 3 converging upon final feature locations for a target image, superimposed upon the target image.
Figure 11:
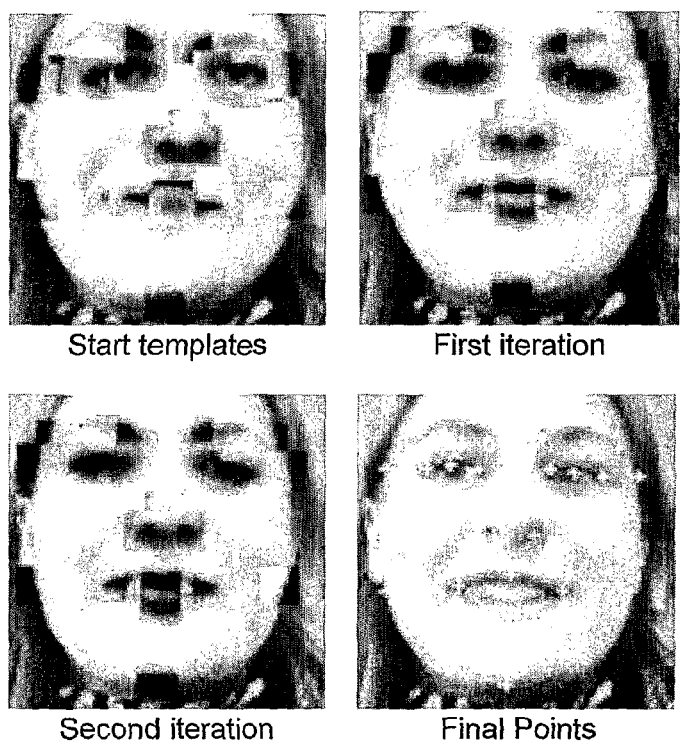
FIG. 11 schematically illustrates template detectors for the embodiment of FIG. 4 converging upon final feature locations for a target image, superimposed upon the target image.

FIGS. 10 and 11 illustrate respectively the full TST and the full TAAM algorithm converging towards a successful search for the feature points for example target images from the BIOID data set. The templates change after each iteration to resemble the target image. FIGS. 10 and 11 both show the target image with the templates superimposed at the start (a), after a first iteration (b), after a second iteration (c) and once the feature points have converged to their final values (d).

Embodiments of the present invention automatically select or adjust the template detectors to match the target image. As such, embodiments of the present invention are well suited to tracking feature locations for objects in video applications because the current templates and feature points can be retained from one video frame to the next. In general, it is likely that there will not be significant object movement from one frame to the next, with the result that the initial feature points for the second frame will be closer to the correct feature locations than if the second frame had been initialised with default feature points (found by searching the whole image). If significant feature movement does occur, such that tracking of the object is lost, then that frame can be reinitialised with default feature points. Embodiments of the present invention are natural tracking methods in the sense that the template detectors learn to match the target image, while still being constrained by the generated model to remain plausible feature templates.

The TST and the TAAM embodiments of the present invention have been tested for video applications by applying them both to three different video sequences of people driving in cars. None of the subjects of the video sequences appeared in the training sets. Each test sequence involved a large amount of lighting variation and head movement, and thus present challenging data sets to track. Each sequence contains approximately 1000 frames (taken at 10 frames per second).

Figure 12:
FIG. 12 illustrates example frames from three video sequences used to test embodiments of the present invention.
Figure 12:
Figure 12:

FIG. 12 contains three example frames from each of the three test video sequences. In each of the three test video sequences the face rotates out of the plane of the video at some point. Therefore, in order to determine whether tracking of the face (i.e. accurate localisation of the facial feature points) has been lost a quality of fit measure is used. If tracking of the face has been lost then it is necessary to reinitialise the TST or TAAM algorithm by using the Viola and Jones face detector discussed above. The quality of fit measure used for the TST and TAAM algorithms is the shape constrained response score, i.e. the output of Equation 5 or Equation 14 respectively. For the AAM algorithm, the quality of fit measure is the sum of differences between the texture model and the target image.

Figure 13:
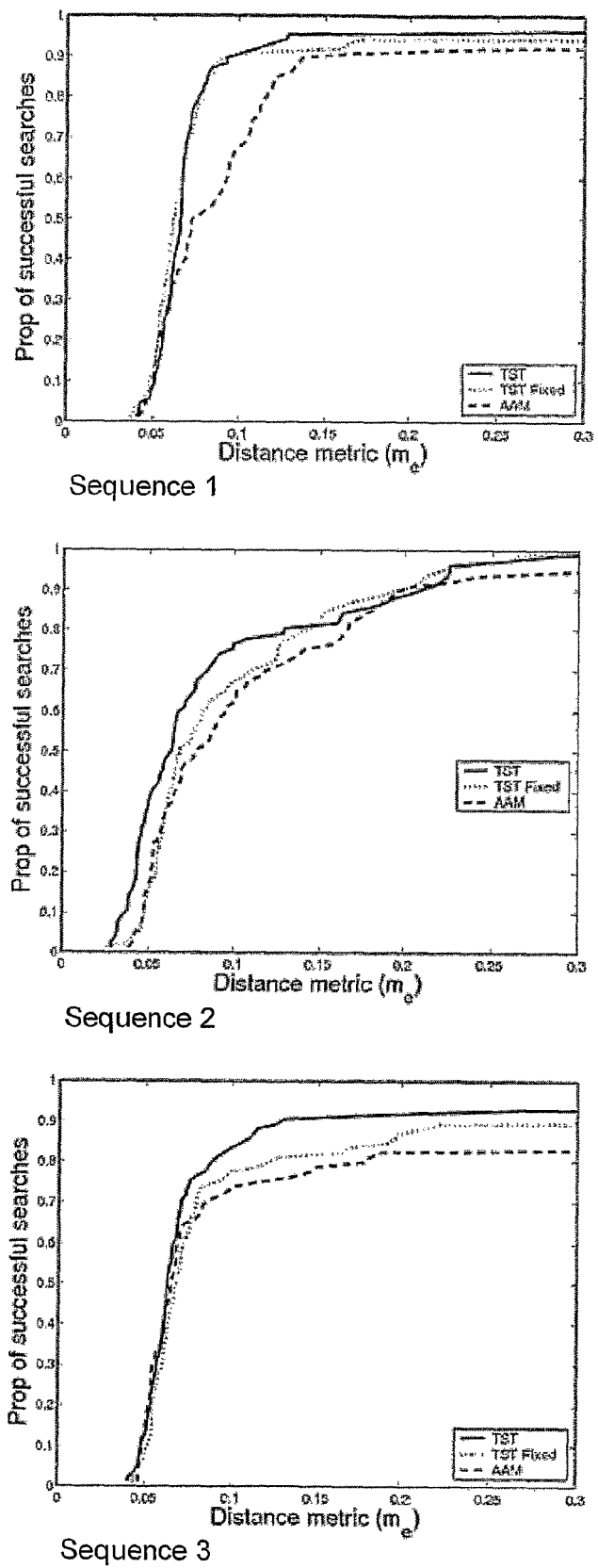
FIG. 13 illustrates the performance of the embodiment of FIG. 3 at localising feature points for each of the three video sequences illustrated in FIG. 12, relative to the performance of a known method of localising feature points for video sequences.
Figure 14:
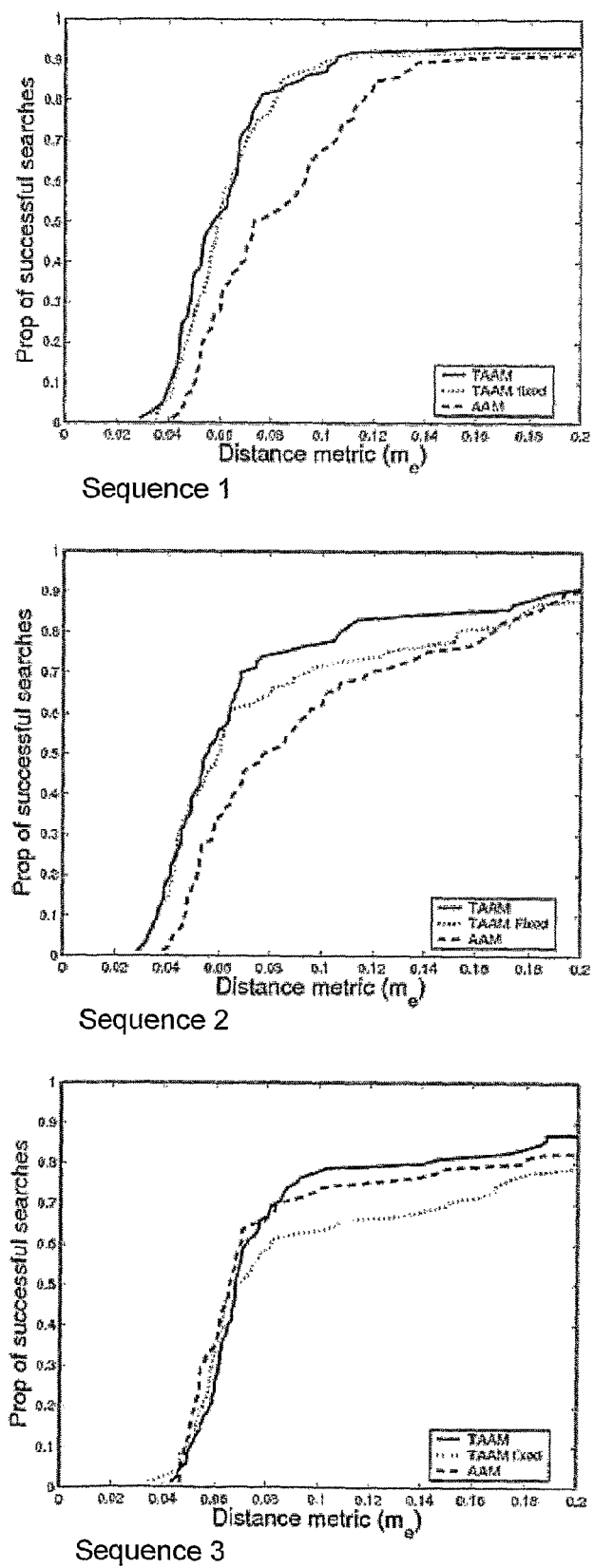
FIG. 14 illustrates the performance of the embodiment of FIG. 4 at localising feature points for each of the three video sequences illustrated in FIG. 12, relative to the performance of a known method of localising feature points for video sequences.

Every tenth frame of each sequence is manually labelled by a human operator, provided that all of the facial feature points are visible, in order to defined a reference point for examining the accuracy of tracking. For each manually labelled face, the distance metric $m_e$ is calculated, assuming that the feature points are located for that frame. If the labelled face cannot be detected then the distance metric $m_e$ is recorded as infinite. The results of this feature points tracking experiment is shown in FIGS. 13 and 14, for the TST algorithm and the TAAM algorithm respectively. FIGS. 13 and 14 show, for each test video sequence, the proportion of successful searches, plotted against distance metric. The proportion of successful searches is, for a given distance metric $m_e$, the proportion of those manually labelled frames in each sequence for which the feature points are located to less than or equal to that distance metric. FIG. 13 shows, for each sequence, the results obtained using both the TST and the TST fixed template procedures (as discussed above), and also the AAM procedure for comparison. FIG. 14 shows, for each sequence, the results obtained using both the TAAM and the TAAM fixed template procedures (as discussed above), and also the AAM procedure for comparison.

FIG. 13 shows that the TST procedure was more effective than both the TST fixed template procedure and the AAM (the AAM was the least effective). In sequence one the TST fixed template procedure shows very similar results to the full TST procedure. This is probably due to the subject of sequence one having facial texture lying close to the mean texture of the TST model.

FIG. 14 shows that the TAAM procedure is on average more effective than the TAAM fixed template procedure and the AAM procedure. However, there is variation over the three sequences. As in FIG. 13, for sequence one the performance using the TAAM fixed template procedure is similar to that for the full TAAM algorithm. Again, this is probably due to the subject of sequence one having facial texture lying close to the mean texture of the TAAM model. The full TAAM algorithm outperforms the TAAM fixed template algorithm for sequences two and three. The AAM is worse than TAAM in sequences one and two, and gives a similar performance in sequence three.

When searching static images, embodiments of the present invention take approximately 120 ms to perform a global search (using the Viola and Jones face detector) and then perform local region detection. The TST, TAAM and AAM feature point searching then takes less than a further 120 ms, but in all three cases the exact time required depends on the number of iterations required. The TST and TAAM embodiments of the present invention each take approximately 40 ms per search iteration. For static images, both the TST and TAAM algorithms require two or three iterations. However, when tracking facial feature points in video sequences, usually only one iteration is required. Therefore, on average when searching a single static image from the BIOID dataset (384*286 pixels) using a P4 3 GHz) computer processor, the full search time was approximately 240 ms (approximately four frames per second). When using the TST or TAAM algorithms to search for feature points in video sequences the average search time drops to 40 ms (due to requiring less iterations and not requiring a global face search), which equates to about 25 frames per second.

Embodiments of the present invention are suitable for image interpretation tasks, for which it is necessary to automatically and accurately locate feature points. Such image interpretation tasks include amongst many others face recognition and medical diagnosis. Embodiments of the present invention have particular advantages in face localisation and recognition in static images. This can be particularly important for security applications automatic editing of face images and automatic avatar generation. Furthermore, due to the inherent object tracking mechanism of the searching method of certain embodiments of the present, the searching method is particularly suited to face tracking and recognition in video sequences (particularly when the current feature points for a new frame are initialised to the converged feature points for the preceding frame). For instance, this can be applied to facial animation, security applications, behaviour monitoring and tiredness detection.

Embodiments of the present invention are particularly suited to applications in the automotive industry, for instance monitoring images of car drivers. By tracking the location of feature points on a drivers face, a range of applications are made possible. For instance, by monitoring for changes in the blink rate of a driver, fatigue can be detected. Embodiments of the present invention may also be used to detect the direction in which a driver is looking. For instance, if the driver is looking away from the direction of travel and a hazard is detected then an alarm can be triggered. Embodiments of the present invention could be used within a system to identify the driver of a vehicle by face recognition.

Other applications of embodiments of the present invention include medical diagnosis, for instance modelling of disease progression and detection of abnormalities.

While embodiments of the present invention have primarily been exemplified with reference to the modelling of faces, it is in no way limited to this. Embodiments of the present invention can be applied for modelling and identifying features of a wide range of classes of object. Embodiments of the present invention are particularly suited to modelling and identifying features classes of objects for which there exists distinctive and corresponding landmarks between different instances of the objects. Further modifications and applications of embodiments of the present invention will be readily apparent to the appropriately skilled person from the teaching herein, without departing from the spirit and scope of the appended claims.

The invention claimed is:

1. A method of locating features of an object, of a class of objects, within a target image, the method comprising:
   initialising a set of feature points within the target image, each feature point corresponding to a predetermined feature for objects of the class of objects;
   deriving a set of template detectors, from the set of feature points within the target image, using a statistical model of the class of objects, each template detector comprising an area of image located about the location of a feature point for an object of the class of objects;
   comparing the set of template detectors with the target image; and
   updating the set of feature points within the target image in response to the result of the comparison.

2. The method of claim 1, wherein the set of template detectors derived using said statistical model collectively represent only part of an object of the class of objects.

3. The method of to claim 1, wherein the set of template detectors derived using said statistical model collectively represent all of an object of the class of objects.

4. The method of claim 1, further comprising after said updating the set of feature points:
   determining whether the average difference between the location of each updated feature point and its preceding location is below a predetermined threshold; and
   outputting the set of feature points as a final set of feature points if the average difference is below the threshold.

5. The method of claim 1, further comprising:
   generating the statistical model from a set of training images, each training image containing an object of the class of objects.

6. The method of claim 5, wherein said generating the statistical model comprises for each training image:
   identifying a set of feature points within the training image corresponding to a predetermined feature of the object within the training image; and
   generating a set of templates, each template comprising an area of image within the training image located about an identified feature point.

7. The method of to claim 6, wherein said identifying a set of feature points comprises a human operator identifying the set of feature points.

8. The method of claim 6, wherein said identifying a set of feature points comprises automatically identifying the set of feature points.

9. The method of claim 6, further comprising:
   generating from the sets of feature points for each training image in the set of training images a shape model representing the spatial distribution of feature points for the set of training images.

10. The method of claim 9, wherein said deriving a set of template detectors comprises:
    generating a set of templates for the target image, each template comprising an area of image located about a feature point within the target image;
    using the shape model to identify a subset of training images within the set of training images which have identified feature points closest to the set of feature points within the target image;
    correlating the set of templates for the target image with the set of templates for each training image within the subset of training images;
    selecting from the subset of training images the training image having a set of templates most correlated to the set of templates for the target image; and
    setting the set of templates for the selected training image as the set of template detectors.

11. The method of claim 6, further comprising:
    generating from the sets of feature points for each training image in the set of training images a shape model representing the spatial distribution of feature points for the set of training images;
    generating from the sets of templates for each training image in the set of training images a texture model representing the distribution of texture for the sets of templates within the set of training images; and
    combining the shape model and the texture model to form a combined shape and texture model.

12. The method of claim 11, wherein said deriving a set of template detectors comprises:
generating a set of templates for the target image, each template comprising an area of image located about a feature point within the target image;
using the combined shape and texture model to generate a modelled set of templates from the set of feature points and the set of templates for the target image; and
setting the generated set of templates as the set of template detectors.

13. The method of claim 1, wherein said comparing the set of template detectors with the target image comprises:
comparing each template detector with a respective area of the target image.

14. The method of claim 1, wherein said comparing the set of template detectors with the target image comprises:
correlating each template detector separately with the target image at a series of positions about the corresponding feature point within the target image to generate a response image, such that a set of response images are formed; and
using a non-linear optimisation to locate the positions of best correlation for each feature point, such that an updated set of feature points is generated, said updated set of feature points forming a valid set of feature points for objects of the class of objects.

15. The method of claim 1, wherein said initialising a set of feature points comprises:
using a global object detector to identify an area of image within the target image containing the object; and
initialising the set of feature points to mean feature point positions within the area of image identified by the global object detector.

16. The method of claim 15, wherein said initialising a set of feature points further comprises:
using a set of feature detectors to identify areas of image within the area of the target image identified using the global object detector containing each feature point; and
initialising each feature point to a mean feature position within the area of image identified by the feature region detector.

17. The method of claim 1, comprising:
locating features of an object within a video sequence comprising a series of target images;
initialising a set of feature points within the first target image; and
initialising a set of feature points for subsequent target images using the updated feature points from the preceding target image.

18. The method of claim 1, wherein the class of objects comprises human faces.

19. A method of locating features of an object, of a class of objects, within a target image, the method comprising:
initialising a set of feature points within the target image, each feature point corresponding to a predetermined feature for objects of the class of objects;
deriving a set of template detectors, from the set of feature points within the target image, using a statistical model of the class of objects, each template detector comprising an area of image located about the location of a feature point for an object of the class of objects;
comparing the set of template detectors with the target image
updating the set of feature points within the target image in response to the result of the comparison; and
repeating the deriving the set of template detectors from the updated set of feature points, the comparing the set of template detectors with the target image and the updating the set of feature points.

20. A method comprising:
modelling the visual appearance of an object, of a class of objects, within a target image;
initialising a set of feature points within the target image, each feature point corresponding to a predetermined feature for objects of the class of objects;
deriving a set of template detectors, from the set of feature points within the target image, using a statistical model of the class of objects, each template detector comprising an area of image located about the location of a feature point for an object of the class of objects;
comparing the set of template detectors with the target image; and
updating the set of feature points within the target image in response to the result of the comparison.

21. A method of modelling the visual appearance of a human face, within a target image, the method comprising:
initialising a set of feature points within the target image, each feature point corresponding to a predetermined facial feature;
deriving a set of template detectors, from the set of feature points within the target image, using a statistical model of human faces, each template detector comprising an area of image located about the location of a facial feature;
comparing the set of template detectors with the target image; and
updating the set of feature points within the target image in response to the result of the comparison.

22. An apparatus for locating features of an object, of a class of objects, within a target image, the apparatus comprising:
means for initialising a set of feature points within the target image, each feature point corresponding to a predetermined feature for objects of the class of objects;
means for deriving a set of template detectors, from the set of feature points within the target image, using a statistical model of the class of objects, each template detector comprising an area of image located about the location of a feature point for an object of the class of objects;
means for comparing the set of template detectors with the target image; and
means for updating the set of feature points within the target image in response to the result of the comparison.

23. A computer apparatus for locating features of an object, of a class of objects, within a target image the apparatus comprising:
a program memory storing processor readable instructions; and
a processor configured to read and execute instructions stored in said program memory to initialise a set of feature points within the target image, derive a set of template detectors, from the set of feature points within the target image, using a statistical model of the class of objects, compare the set of template detectors with the target image, and update the set of feature points within the target image in response to the result of the comparison, each feature point corresponding to a predetermined feature for objects of the class of objects, each template detector comprising an area of image located about the location of a feature point for an object of the class of objects.

* * * * *